(12) United States Patent
Zhu et al.

(10) Patent No.: US 12,055,982 B2
(45) Date of Patent: Aug. 6, 2024

(54) MOBILE TERMINAL

(71) Applicant: HUAWEI TECHNOLOGIES CO., LTD., Shenzhen (CN)

(72) Inventors: Mingchao Zhu, Wuhan (CN); Yukun He, Wuhan (CN); Xiaodong Jie, Wuhan (CN); Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 17/632,059

(22) PCT Filed: Jul. 27, 2020

(86) PCT No.: PCT/CN2020/104836
§ 371 (c)(1),
(2) Date: Feb. 1, 2022

(87) PCT Pub. No.: WO2021/023043
PCT Pub. Date: Feb. 11, 2021

(65) Prior Publication Data
US 2022/0276681 A1   Sep. 1, 2022

(30) Foreign Application Priority Data

Aug. 6, 2019   (CN) .......................... 201910721872.X

(51) Int. Cl.
*G06F 1/16*   (2006.01)
(52) U.S. Cl.
CPC .......... *G06F 1/1681* (2013.01); *G06F 1/1616* (2013.01)

(58) Field of Classification Search
CPC .... G06F 1/1681; G06F 1/1616; G06F 1/1637; H04M 1/0216; H04M 1/0266; H04M 1/0283
See application file for complete search history.

(56) References Cited

U.S. PATENT DOCUMENTS 5,796,576 A  *  8/1998  Kim ...................... G06F 1/1616
                                                        16/259
9,182,791 B2 *  11/2015  Nakamura ............ G06F 1/1683
(Continued)

FOREIGN PATENT DOCUMENTS

| CN | 201035465 Y | 3/2008 |
| CN | 102655721 A | 9/2012 |

(Continued)

*Primary Examiner* — Anthony M Haughton
*Assistant Examiner* — Theron S Milliser
(74) *Attorney, Agent, or Firm* — Maier & Maier, PLLC

(57) ABSTRACT

A mobile terminal includes a display module, a host module, and a hinge used to connect the display module and the host module. The hinge is disposed on a bottom border of the display module. The display module includes a top cover and a hinge cover that covers the hinge, and the top cover has an accommodating cavity. A screen body, a screen drive plate, and a screen cover plate that covers the screen body are accommodated in the accommodating cavity, and a part of the screen cover plate extends into a cavity of the hinge cover, so that the hinge cover overlaps the part of the screen cover plate. In this technical solution, a width of the bottom border of the display module can be effectively reduced, to facilitate implementation of a narrow border design of the display module.

16 Claims, 7 Drawing Sheets

(56) References Cited

U.S. PATENT DOCUMENTS

| | | | |
|---|---|---|---|
| 10,963,019 B2* | 3/2021 | Peng | G06F 1/1688 |
| 11,347,275 B2* | 5/2022 | Hsu | G06F 1/1616 |
| 11,360,519 B2* | 6/2022 | Peng | G06F 1/1656 |
| 11,360,524 B2* | 6/2022 | Peng | G06F 1/1698 |
| 11,785,725 B2* | 10/2023 | Yang | G02F 1/133308 |
| | | | 361/807 |
| 2004/0165345 A1 | 8/2004 | Bang | |
| 2014/0307380 A1* | 10/2014 | Nakamura | G06F 1/1683 |
| | | | 361/679.27 |
| 2018/0032105 A1 | 2/2018 | Mathew et al. | |
| 2020/0387196 A1* | 12/2020 | Peng | G06F 1/1656 |
| 2020/0387200 A1* | 12/2020 | Peng | G06F 1/1616 |
| 2021/0157369 A1* | 5/2021 | Peng | H05K 1/189 |
| 2021/0216110 A1* | 7/2021 | Hsu | G06F 1/1616 |
| 2022/0087035 A1* | 3/2022 | Yang | G02F 1/133308 |

FOREIGN PATENT DOCUMENTS

| | | |
|---|---|---|
| CN | 103576774 A | 2/2014 |
| CN | 205091659 U | 3/2016 |
| CN | 107562129 A | 1/2018 |
| CN | 207560085 U | 6/2018 |
| CN | 108656042 A | 10/2018 |
| CN | 109656042 A | 4/2019 |
| CN | 109782854 A | 5/2019 |
| CN | 109960332 A | 7/2019 |
| CN | 110580084 A | 12/2019 |
| TW | 201814127 A | 4/2018 |
| WO | 2018079453 A1 | 5/2018 |

\* cited by examiner

MOBILE TERMINAL

CROSS-REFERENCE TO RELATED APPLICATIONS

This application claims priority to Chinese Patent Application No. 201910721872.X, filed with the China National Intellectual Property Administration on Aug. 6, 2019 and entitled "MOBILE TERMINAL", which is incorporated herein by reference in its entirety.

FIELD

The embodiments relate to the field of terminal devices, and in particular, to a mobile terminal.

BACKGROUND

A screen border of a conventional notebook computer is relatively wide, and this affects the visual perception of a user. Manufacturers have made great efforts to narrow the screen border of the notebook computer. However, in an existing technology, because both a hinge structure used to connect a host module and a display module and a drive circuit used to drive display of a display occupy space of the display, it is difficult to narrow a size of a screen border that connects the display module and the host module. Therefore, in the industry, a screen-to-body ratio of the notebook computer is usually improved by narrowing other three borders of the notebook computer, and a screen-to-body ratio of the display cannot be maximized.

SUMMARY

The embodiments provide a mobile terminal, to implement a narrow border for a display of the mobile terminal.

A mobile terminal comprises three parts: a display module, a host module, and a hinge used to connect the display module and the host module. The hinge may be disposed on a bottom border of the display module. When the display module is specifically disposed, a top cover is disposed on the display module, and the top cover has an accommodating cavity. A screen body and a screen drive plate are accommodated in the accommodating cavity, a screen cover plate covers the screen body, and a part of the screen cover plate extends into a cavity of a hinge cover, so that the hinge cover overlaps the part of the screen cover plate. In this way, the bottom border of the display module can be effectively narrowed.

When the screen cover plate is specifically disposed, the screen cover plate may be a cover plate frame, so that a display area of the screen body can be exposed when the screen cover plate covers the screen body. After the screen cover plate covers the screen body, the screen cover plate and the screen body may be bonded by using adhesive such as a double-sided tape. A material of the screen cover plate may be glass, polyester resin, or plastic.

In a possible implementation, the screen drive plate and the screen body may be disposed side by side, and the screen drive plate and the screen body are connected by using an FPC. In addition, the screen drive plate is disposed closer to the hinge cover relative to the screen body, so that a part of the screen drive plate extends into the cavity of the hinge cover. Therefore, the part of the screen drive plate overlaps a part of the hinge cover. This solution is also applicable to an existing common screen in the industry, and a customized screen is not required, so that costs of this solution can be effectively controlled.

In a possible implementation, a top cover support may further be disposed at an end that is of the top cover and at which the hinge is disposed, and the hinge cover covers the top cover support, and is fastened to the top cover support. To fasten the hinge cover and the top cover support, the hinge cover and the top cover support may be fastened by using a fastener, or the hinge cover may be snapped on the top cover support by using a snap member such as a snap hook.

In a possible implementation, when the top cover support is specifically disposed, a cover plate support platform may be disposed on the top cover support, so that when the screen cover plate extends into the cavity of the hinge cover, the screen cover plate may be laid on the cover plate support platform, and therefore structural stability of the screen cover plate is relatively good. The cover plate support platform used to support the screen cover plate is also disposed in the hinge cover and does not need to occupy additional width space of the bottom border of the display module. This facilitates the implementation of a narrow border for the display module.

In addition, after the cover plate is laid on the cover plate support platform, when the hinge cover is fastened to the top cover support, the screen cover plate can be pressed against the cover plate support platform, or adhesive may be separately disposed between the hinge cover and the screen cover plate and between the screen cover plate and the cover plate support platform, so that two adjacent structures are connected through bonding.

In a possible implementation, when the hinge cover is specifically disposed, the hinge cover includes two parts: a hinge cover support and a decorative cover. The hinge cover support is fastened to the decorative cover, and for example, the hinge cover support is fastened to the decorative cover by using a fastener, or the hinge cover support is snapped on the decorative cover by using a snap hook.

In a possible implementation, when the hinge cover support is specifically disposed, the hinge cover support may be fixedly connected to the top cover support. The hinge cover support is fastened to the top cover support by using a fastener, or the hinge cover support is snapped on the top cover support by using a snap hook. In addition, when the hinge cover support is fastened to the top cover support, the hinge cover support may further press the screen cover plate against the cover plate support platform, to fasten the screen cover plate.

In a possible implementation, the screen body is a touch display with a touch function. In this case, the display module further includes a screen touch drive panel, the screen touch drive panel and the screen body may be connected by using an FPC, and the screen touch drive panel may be disposed in the cavity of the hinge cover. In this way, when the screen touch drive plate is disposed, a width area of the bottom border of the display module is not additionally occupied, to facilitate implementation of a narrow border for the display module.

DETAILED DESCRIPTION OF THE EMBODIMENTS

To make the objectives, solutions, and advantages clearer, the following further describes various embodiments with reference to the accompanying drawings.

Figure 1:
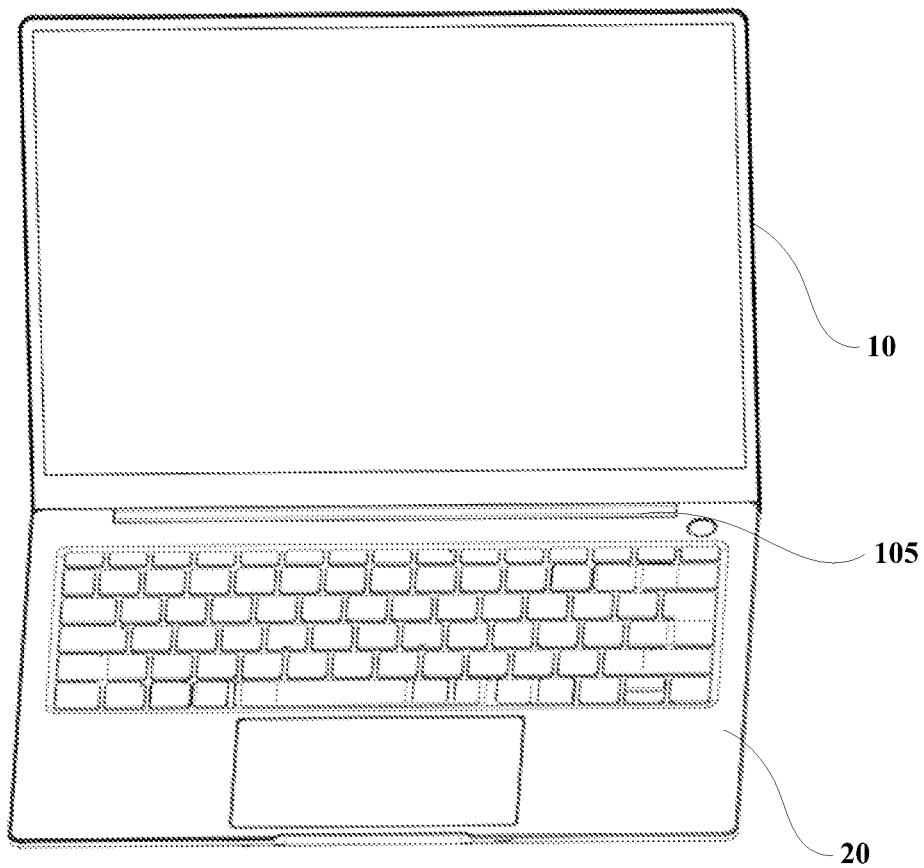
FIG. 1 is a schematic diagram of a structure of a mobile terminal according to an embodiment.
Figure 2:
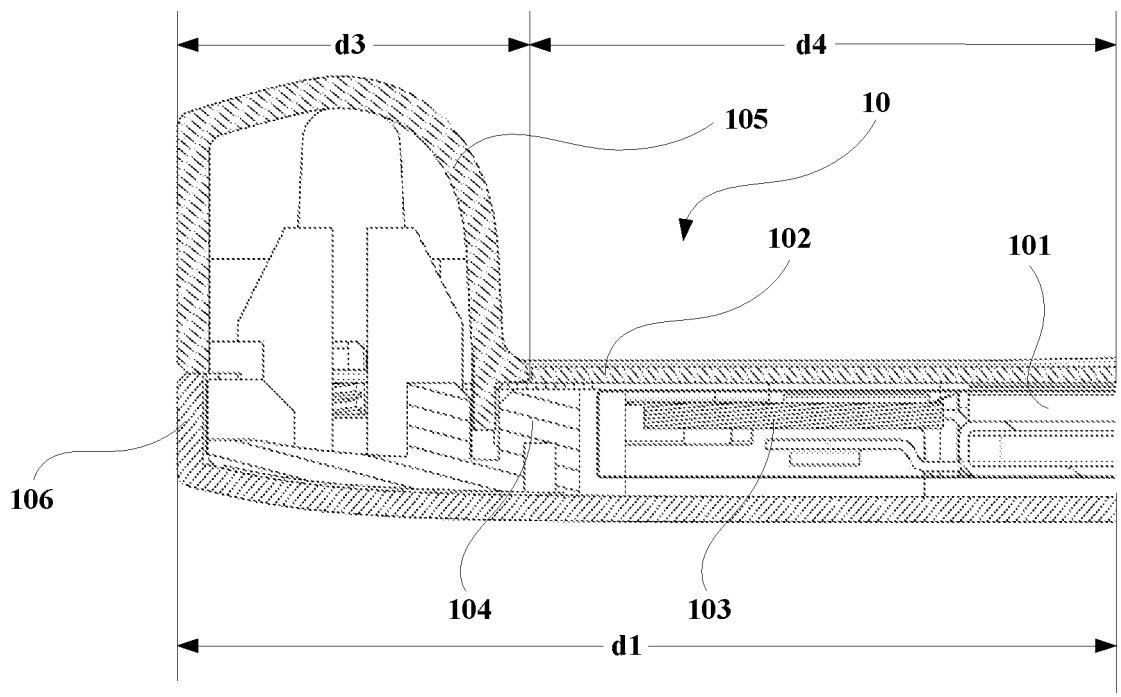
FIG. 2 is a sectional view of a bottom screen border of a mobile terminal according to an embodiment of an existing technology.

FIG. 1 shows a mobile terminal. The mobile terminal mainly includes a display module 10, a host module 20, and a hinge (not shown in the figure) used to connect the display module 10 and the host module 20. FIG. 2 is a sectional view of a screen border at an end at which a display module 10 of a conventional notebook computer is connected to a hinge (in the following descriptions, the end at which the display module 10 is connected to the hinge is referred to as a bottom end of the display module 10, and a border that is of a corresponding screen and that is located at a bottom end of the display module 10 is referred to as a bottom border of the screen). The display module 10 includes a top cover 106, a screen body 101 accommodated in the top cover 106, a screen drive plate 103 connected to the screen body 101, and a screen cover plate 102 that covers the screen body 101 and the screen drive plate 103. A width d1 of a bottom border of the display module 10 of the notebook computer is a sum of a width d3 of a hinge cover 105 that covers the hinge and a width d4 of a bottom border of the screen cover plate 102. The screen drive plate 103, a bottom border of the screen body 101, and a support platform 104 that is used to support the screen cover plate 102 are covered by the bottom border of the screen cover plate 102. For this solution, in an existing technology, a bottom border of the display module 10 is narrowed by narrowing the screen drive plate 103 and the bottom border of the screen body 101. However, this solution is only applicable to a customized screen, costs are relatively high, and a limited width is narrowed.

Figure 3:
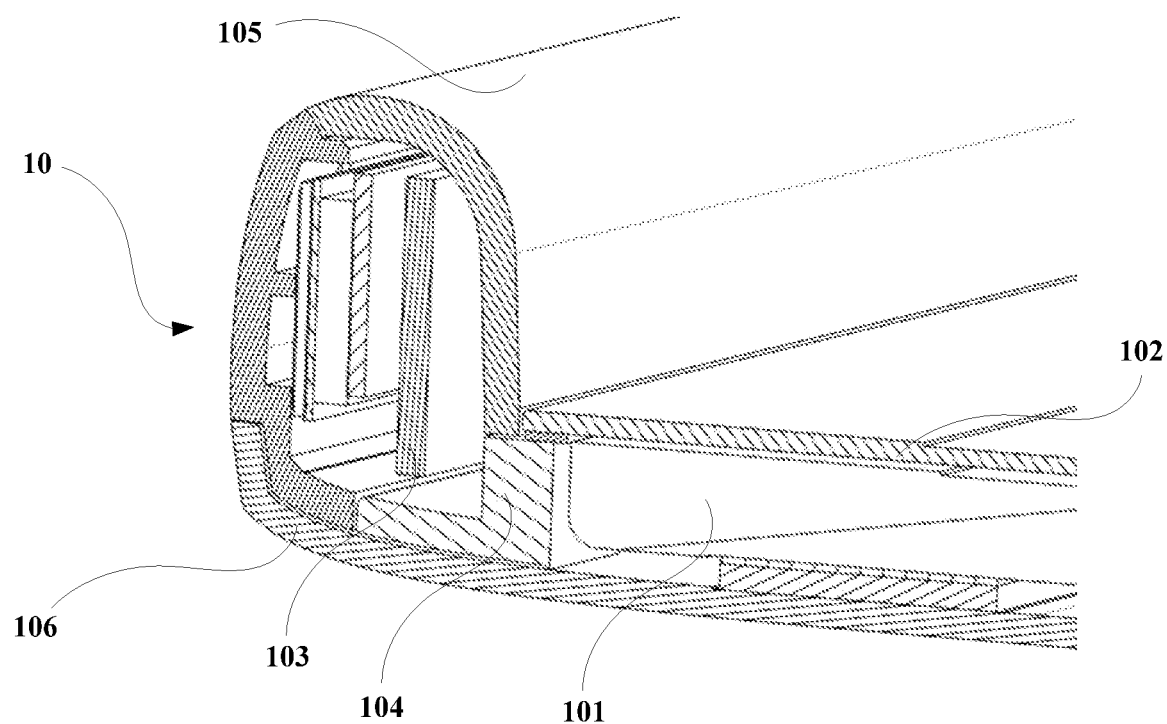
FIG. 3 is a sectional view of a bottom screen border of a mobile terminal according to another embodiment of an existing technology.

To further narrow the bottom border of the display module 10, in a solution shown in FIG. 3, the screen drive plate 103 is separated from the screen body 101, and then the screen drive plate 103 and the screen body 101 are connected by using an FPC (flexible printed circuit). In this way, the screen drive plate 103 can be vertically disposed in the hinge cover 105, and a width of the bottom border of the display module 10 is a sum of widths that are obtained after the hinge cover 105, the cover plate support platform 104, and the bottom border of the screen body 101 are successively lined up. In this solution, although a size of the bottom border of the display module 10 can be reduced, it is difficult to produce, position, and assemble the display module 10, and costs are relatively high. Therefore, this solution is only applicable to a customized screen on which the screen drive plate 103 and the screen body 101 are separated from each other and is not applicable to an existing common screen in the industry.

To resolve a problem existing in the foregoing solution for narrowing the bottom border of the display module and implement a narrow border for the bottom border of the display module an embodiment provides a mobile terminal, and the mobile terminal may be but is not limited to a notebook computer. The following describes, in detail with reference to the accompanying drawings, the mobile terminal provided in this embodiment.

Figure 5:
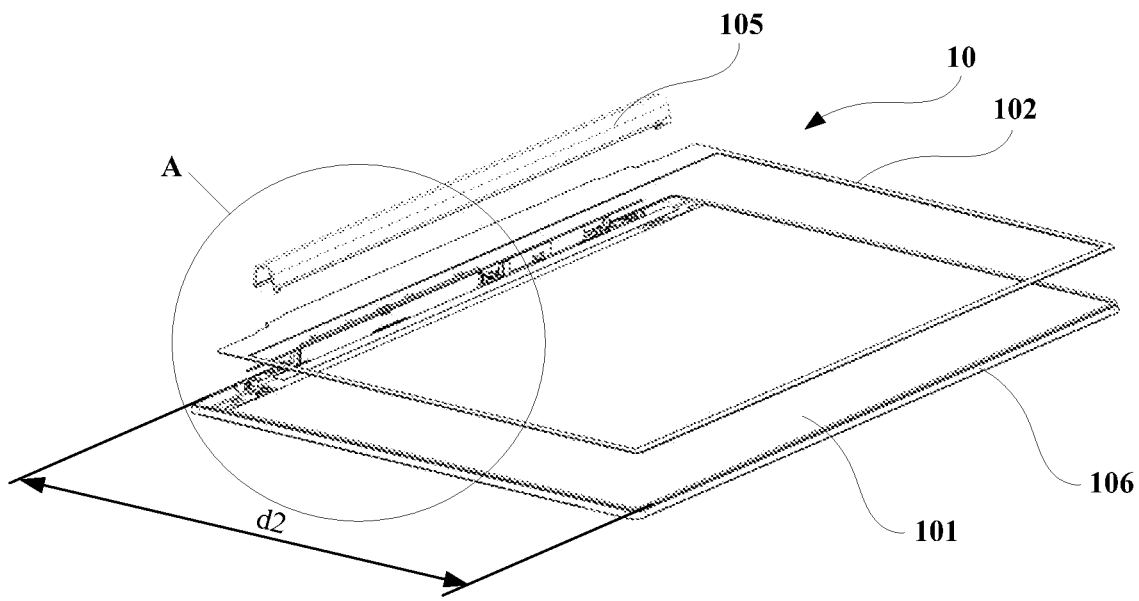
FIG. 5 is a schematic diagram of an exploded structure of a display module of a mobile terminal according to an embodiment.
Figure 6:
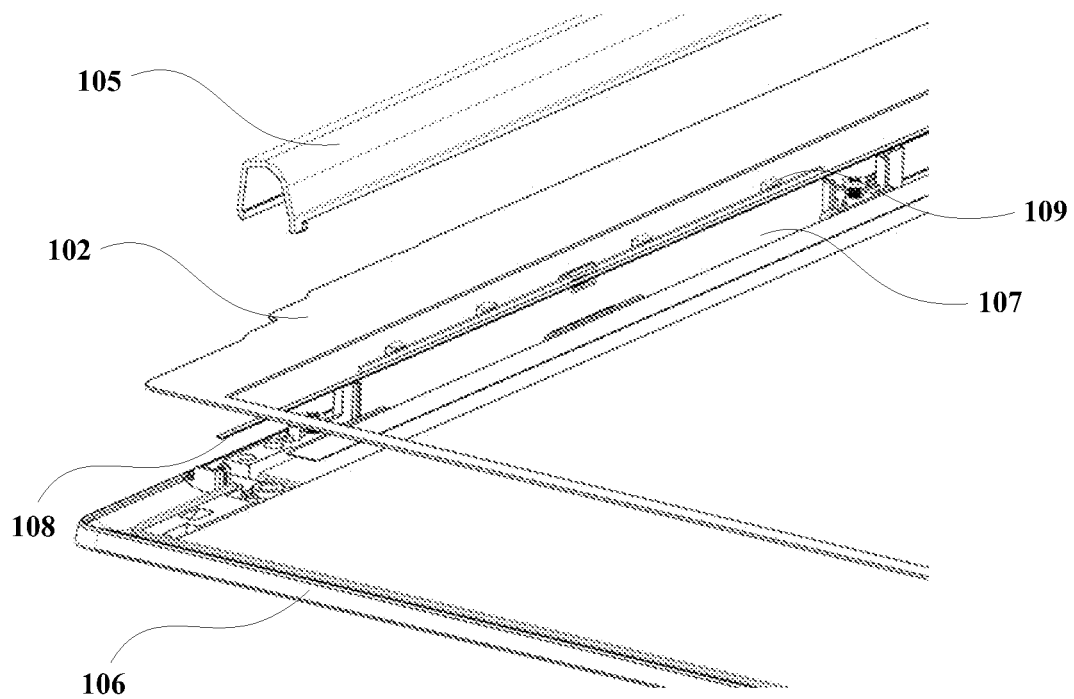
FIG. 6 is a schematic diagram of a partial structure of a location A in FIG. 5.

For a structure of a mobile terminal provided in an embodiment, refer to FIG. 1. The mobile terminal may also include a display module 10, a host module 20, and a hinge used to connect the display module 10 and the host module 20. The hinge 30 may be disposed on a bottom border of the display module 10. It may be learned that a hinge cover 105 covers the hinge 30. FIG. 5 is a schematic diagram of an exploded structure of the display module 10. The display module 10 includes a top cover 106, and the top cover 106 has an accommodating cavity. A width of the accommodating cavity is denoted by d2. Refer to FIG. 6.

Figure 4:
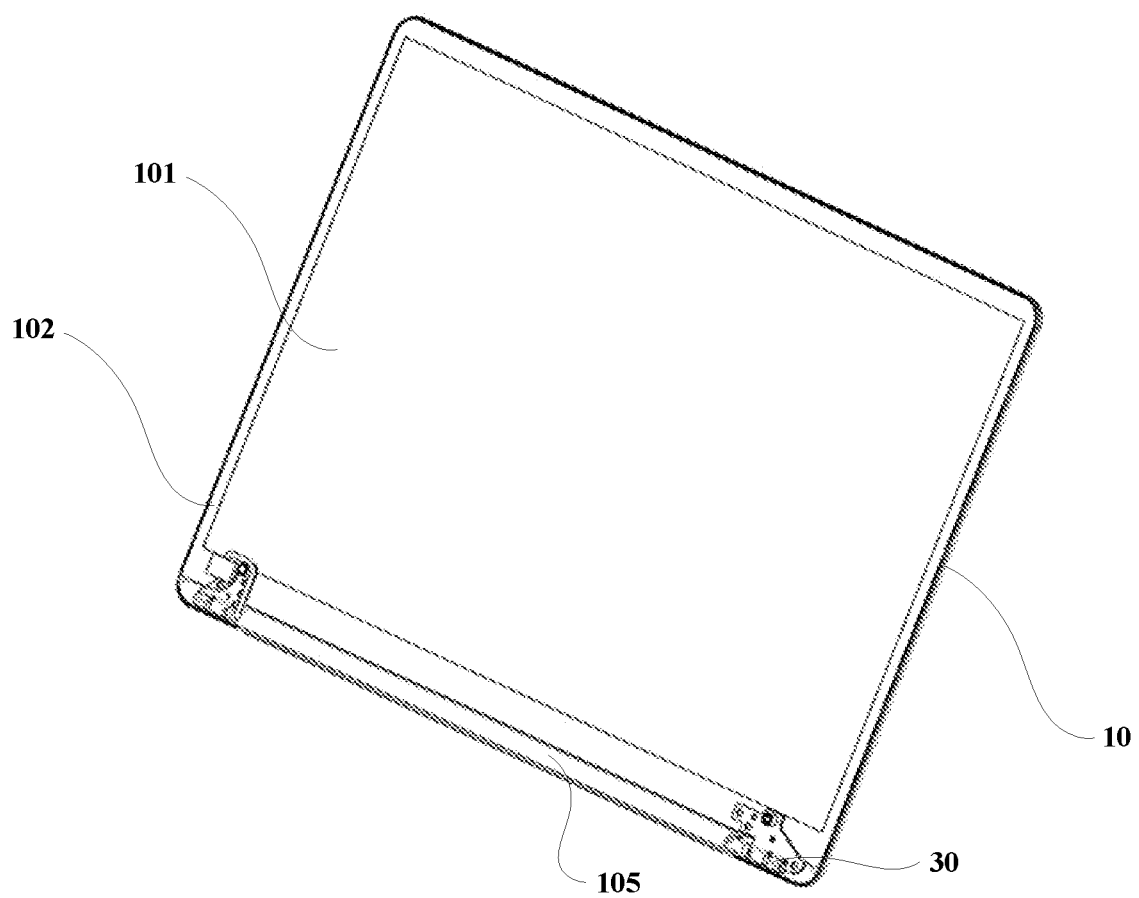
FIG. 4 is a schematic diagram of a structure of a display module of a mobile terminal according to an embodiment.

A top cover support 107 is disposed at an end at which the top cover 106 is connected to the hinge 30 (refer to FIG. 4). There may be a plurality of manners for fastening the top cover support 107 to the top cover 106. For example, the top cover support 107 is fastened to the top cover 106 by using a fastener such as a screw, or the top cover support 107 and the top cover 106 are in an integrated structure. In addition, the hinge cover 105 covers the top cover support 107 and is fixedly connected to the top cover support 107. There may be a plurality of manners for connecting the hinge cover 105 and the top cover support 107. For example, the hinge cover 105 may be directly bonded to the top cover support 107 by using adhesive such as a double-sided tape 108 or may be snapped on the top cover support 107 by using a snap hook 109, or the hinge cover 105 and the top cover support 107 may be connected in a manner of both bonding and snapping, to increase reliability of the connection between the hinge cover 105 and the top cover support 107. It should be understood that the foregoing descriptions are merely some example descriptions of a manner of fastening the hinge cover 105 and the top cover support 107. In this embodiment, the hinge cover 105 and the top cover support 107 may alternatively be fastened in another possible manner.

Figure 7:
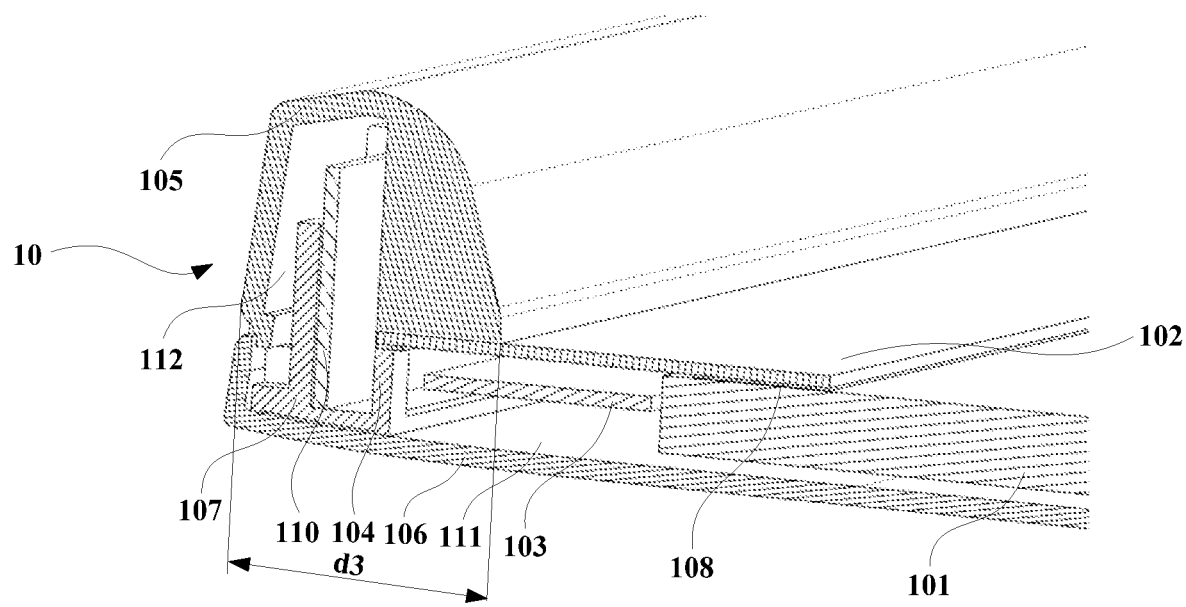
FIG. 7 is a sectional view of a bottom screen border of a mobile terminal according to an embodiment.

In addition, as shown in FIG. 7, to implement display, the display module 10 may further include a screen body 101 and a screen drive plate 103 that are disposed in an accommodating cavity 111 (a range of the accommodating cavity 111 is denoted by d2 in FIG. 5) of the top cover 106, and a screen cover plate 102 that covers the screen body 101. The screen cover plate 102 is a cover plate frame that can expose a display area of the screen body 101. The screen cover plate 102 covers the screen cover plate 102, to fasten and protect the screen body 101. When the screen cover plate 102 covers the screen body 101, as shown in FIG. 7, the screen cover plate 102 may be bonded to a bottom border of the screen body 101 by using adhesive such as a double-sided tape 108, and a material of the screen cover plate 102 may be glass, polyester resin, or plastic.

A part of the screen cover plate 102 extends into a cavity 112 of the hinge cover 105, and a width of the cavity 112 is denoted by d3 in the figure, so that the hinge cover 105 overlaps the part of the screen cover plate 102. In addition, the top cover support 107 may further include a cover plate support platform 104, so that the screen cover plate 102 may be laid on the cover plate support platform 104, to stably support the screen cover plate 102. The cover plate support platform 104 may alternatively be an independent structure disposed in the top cover 106, and the independently disposed cover plate support platform 104 may alternatively be disposed in the cavity 112 of the hinge cover 105. In this way, after the hinge cover 105 is fastened, the hinge cover 105 may press the screen cover plate 102, so that the screen cover plate 102 abuts against the cover plate support platform 104. To make a connection between the screen cover plate 102 and the hinge cover 105 and a connection between the screen cover plate 102 and the cover plate support platform 104 more reliable, as shown in FIG. 8, the screen cover plate 102 and the hinge cover 105 may be bonded and the screen cover plate 102 and the cover plate support platform 104 may be bonded by using adhesive such as the double-sided tape 108.

Figure 8:
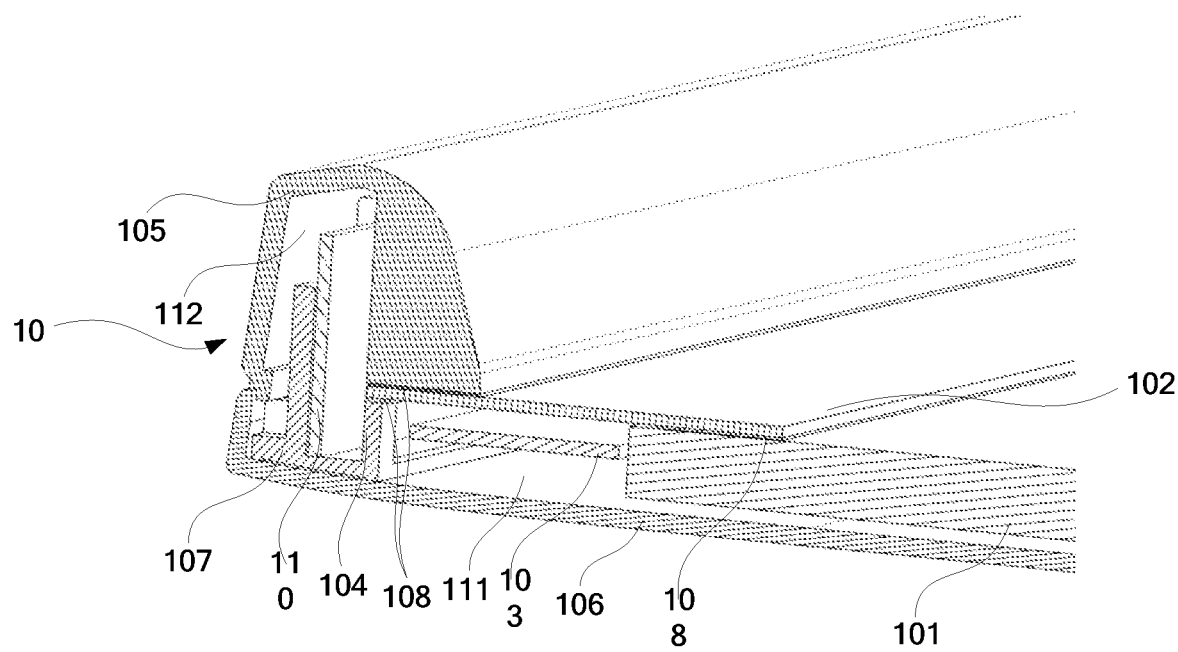
FIG. 8 is a sectional view of a bottom screen border of a mobile terminal according to another embodiment.

When the screen drive plate 103 and the screen body 101 are specifically disposed, as shown in FIG. 7 or FIG. 8, the screen drive plate 103 and the screen body 101 are disposed side by side, and the screen drive plate 103 and the screen body 101 may be connected by using an FPC (not shown in the figure). In addition, the screen drive plate 103 is disposed closer to the hinge cover 105 relative to the screen body 101. It may be understood that the screen drive plate 103 is disposed below the screen cover plate 102. It can be learned from the embodiment shown in FIG. 7 or FIG. 8 that a part of the screen drive plate 103 extends into a lower part of the hinge cover 105, so that the screen drive plate 103 overlaps a part of the hinge cover 105.

When the screen body 101 of the mobile terminal in this embodiment is a touch display, a screen touch drive panel 110 needs to be further disposed in the display module 10. The screen touch drive panel 110 may be disposed in an inner cavity of the hinge cover 105, and the screen touch drive panel 110 is connected to the screen body 101 by using an FPC. In this way, for disposing of the screen touch drive panel 110, space of a bottom border of the display module 10 does not need to be additionally occupied.

In this embodiment, a part of the screen cover plate 102 and a part of the screen drive plate 103 extend into the cavity 112 of the hinge cover 105, and the cover plate support platform 104 used to support the screen cover plate 102 is also disposed in the cavity 112 of the hinge cover 105. In this way, the screen cover plate 102, the screen drive plate 103, and the cover plate support platform 104 each have a part that overlaps a width size of the hinge cover 105, so that a width size of the bottom border of the display module 10 can be effectively reduced, to facilitate implementation of a narrow border for the display module 10. In addition, this solution is also applicable to an existing common screen in the industry, and a customized screen is not required, so that costs of this solution can be effectively controlled.

When the display module 10 in this embodiment is assembled, the screen drive plate 103 and the screen body 101 that are connected by using the FPC may be first placed in the accommodating cavity 111 of the top cover 106. Then, the screen cover plate 102 covers the screen body 101, a part of the screen cover plate 102 extends into the hinge cover 105 and is laid on the cover plate support platform 104. In addition, the screen cover plate 102 and the bottom border of the screen body 101 may be correspondingly bonded by using the double-sided tape 108 or the like, or the screen cover plate 102 and the cover plate support platform 104 may be bonded by using adhesive such as the double-sided tape 108. Finally, the hinge cover 105 covers the top cover support 107, and the hinge cover 105 and the top cover support 107 are bonded to each other by using the double-sided tape 108 or the like or are fastened through snapping by using a snap hook 109 shown in FIG. 6. After the hinge cover 105 is fastened to the top cover support 107, the hinge cover 105 may press the screen cover plate 102 against the top cover support 107, so that structural stability of the display module 10 is relatively good. Production and assembly processes can be effectively simplified, and assembly efficiency can be improved.

In some other embodiments, for a structure of the mobile terminal, refer to FIG. 1. The mobile terminal in this embodiment includes a display module 10, a host module 20, and a hinge 30 used to connect the display module 10 and the host module 20. The hinge 30 may be disposed on a bottom border of the display module 10, and a hinge cover 105 covers the hinge 30.

Figure 9:
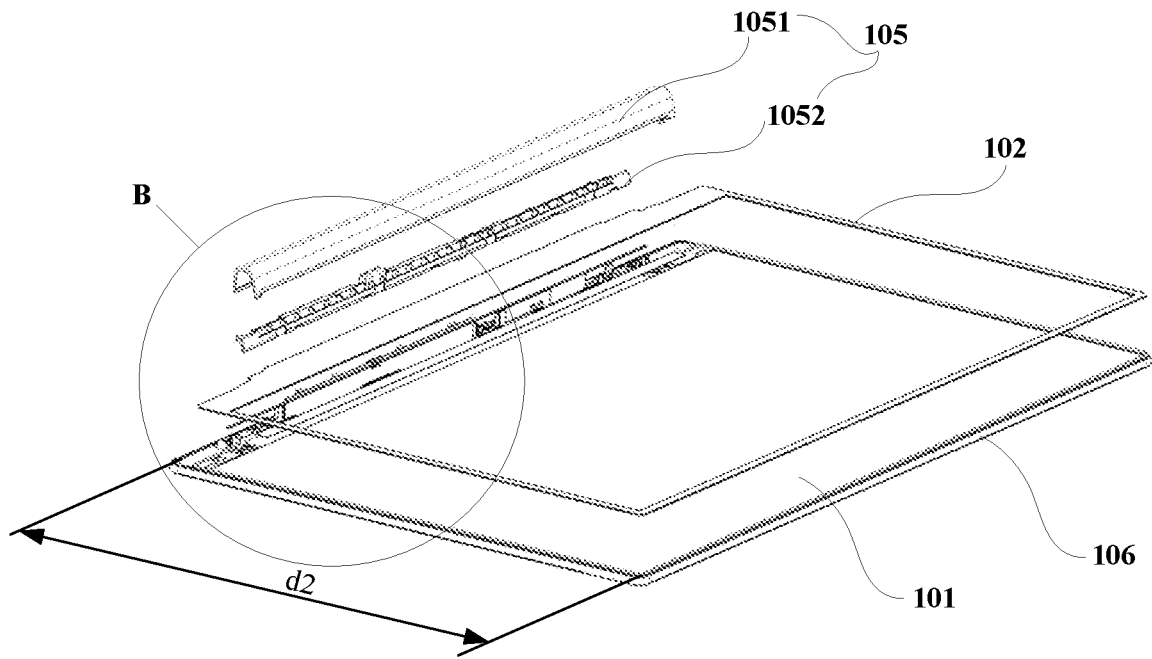
FIG. 9 is a schematic diagram of an exploded structure of a display module of a mobile terminal according to an embodiment.
Figure 10:
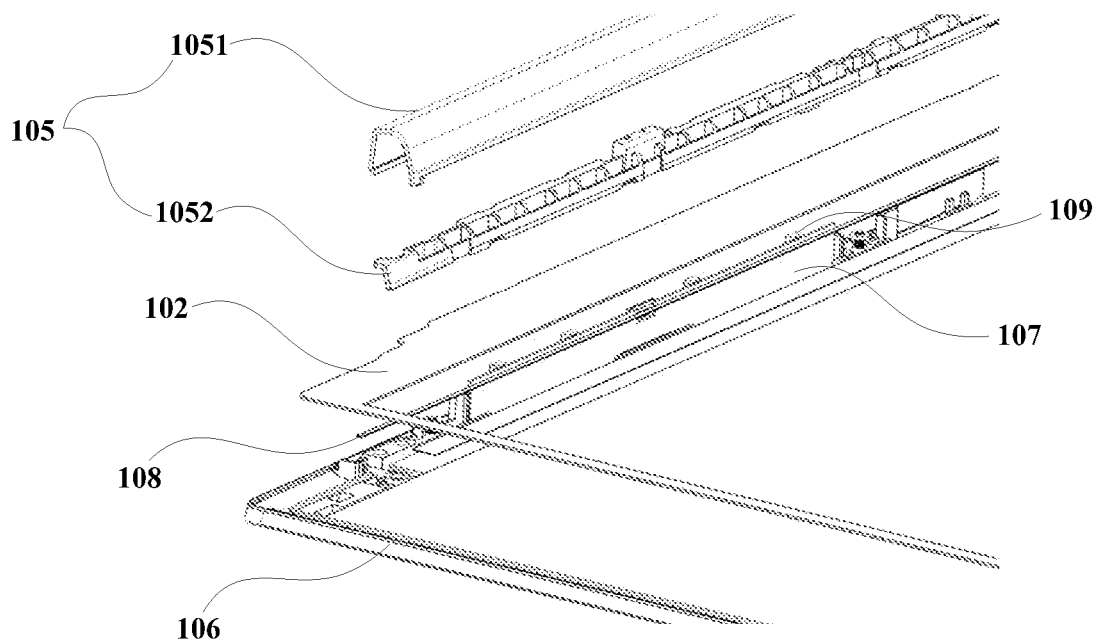
FIG. 10 is a schematic diagram of a partial structure of a location B in FIG. 9.

FIG. 9 is a schematic diagram of an exploded structure of the display module 10. The display module 10 in this embodiment also includes a top cover 106, and an accommodating cavity is disposed on the top cover 106. A width of the accommodating cavity is denoted by d2 in the figure. Refer to FIG. 10. A top cover support 107 is disposed at an end at which the top cover 106 is connected to the hinge 30 (refer to FIG. 4). There may be a plurality of manners for fastening the top cover support 107 to the top cover 106. For example, the top cover support 107 is fastened to the top cover 106 by using a fastener such as a screw, or the top cover support 107 and the top cover 106 are in an integrated structure.

In addition, still refer to FIG. 10. The hinge cover 105 covers the top cover support 107 and is fixedly connected to the top cover support 107. A manner of disposing the hinge cover 105 slightly differs from that in the foregoing embodiment in that the hinge cover 105 mainly includes two parts: a decorative cover 1051 and a hinge cover support 1052. The hinge cover support 1052 may be used as a support member to support the decorative cover 1051 or may be used as a connection member. One aspect of the hinge cover support 1052 is connected to the top cover support 107. There may be a plurality of manners for connecting the hinge cover support 1052 and the top cover support 107. For example, the hinge cover support 1052 may be fastened to the top cover support 107 by using a fastener such as a bolt or may be snapped on the top cover support 107 by using a snap hook 109. It should be understood that the foregoing descriptions are merely some example descriptions of a manner of fastening the hinge cover support 1052 and the top cover support 107. In this embodiment, the hinge cover support 1052 and the top cover support 107 may alternatively be fastened in another possible manner. In addition, the hinge cover support 1052 is further connected to the decorative cover 1051. Optionally, the hinge cover support 1052 is connected to the decorative cover 1051 by using a fastener such as a bolt or is connected to the decorative cover 1051 by using a snap structure such as a snap hook 109. The hinge cover 105 is disposed as a structure obtained by assembling the decorative cover 1051 and the hinge cover support 1052, so that the hinge cover support 1052 and the decorative cover 1051 may be separately processed. In this way, a processing process can be simplified, and processing costs are reduced.

Figure 11:
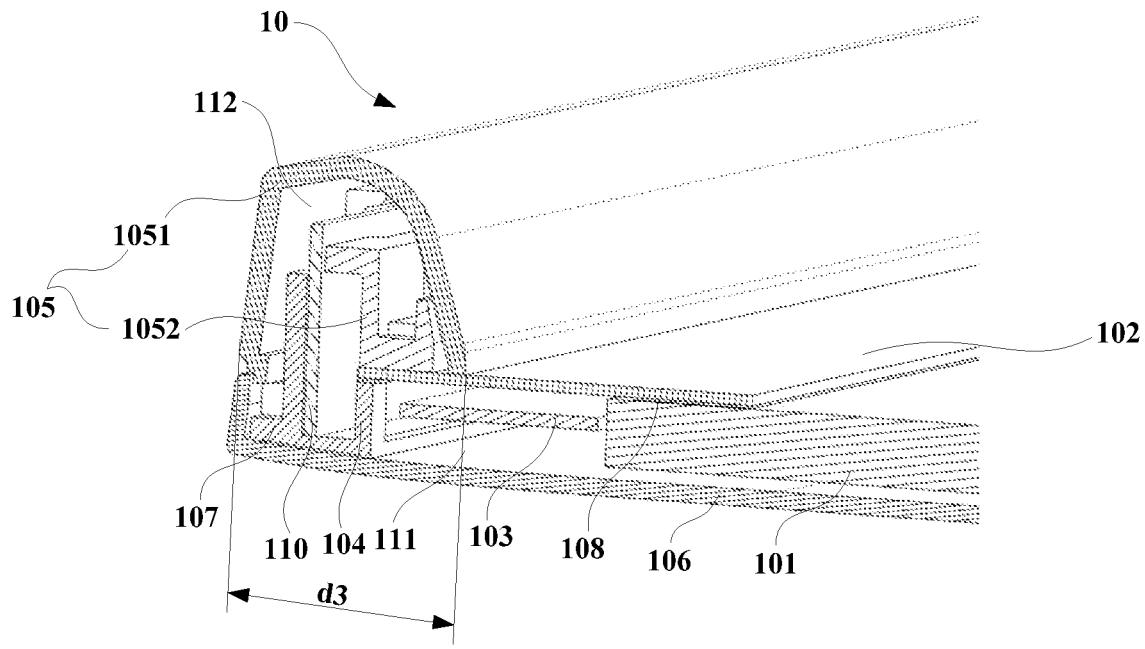
FIG. 11 is a sectional view of a bottom screen border of a mobile terminal according to an embodiment.

In addition, as shown in FIG. 11, to implement display, the display module 10 may further include a screen body 101 and a screen drive plate 103 that are disposed in an accommodating cavity 111 of the top cover 106, and a screen cover plate 102 that covers the screen body 101. The screen cover plate 102 is a cover frame that can expose a display area of the screen body 101. The screen cover plate 102 covers the screen cover plate 102, to fasten and protect the screen body 101. When the screen cover plate 102 covers the screen body 101, as shown in FIG. 11, the screen cover plate 102 may be bonded to a bottom border of the screen body 101 by using adhesive such as a double-sided tape 108, and a material of the screen cover plate 102 may be glass, polyester resin, or plastic.

A part of the screen cover plate 102 extends into a cavity 112 of the decorative cover 1051, and a width of the cavity 112 of the decorative cover 1051 is denoted by d3, so that the decorative cover 1051 overlaps the part of the screen cover plate 102. In addition, the top cover support 107 may further include a cover plate support platform 104, so that the screen cover plate 102 is laid on the cover plate support platform 104, to stably support the screen cover plate 102. The cover plate support platform 104 may alternatively be an independent structure disposed in the top cover 106, and the independently disposed cover plate support platform 104 may alternatively be disposed in the cavity 112 of the hinge cover 105.

Figure 12:
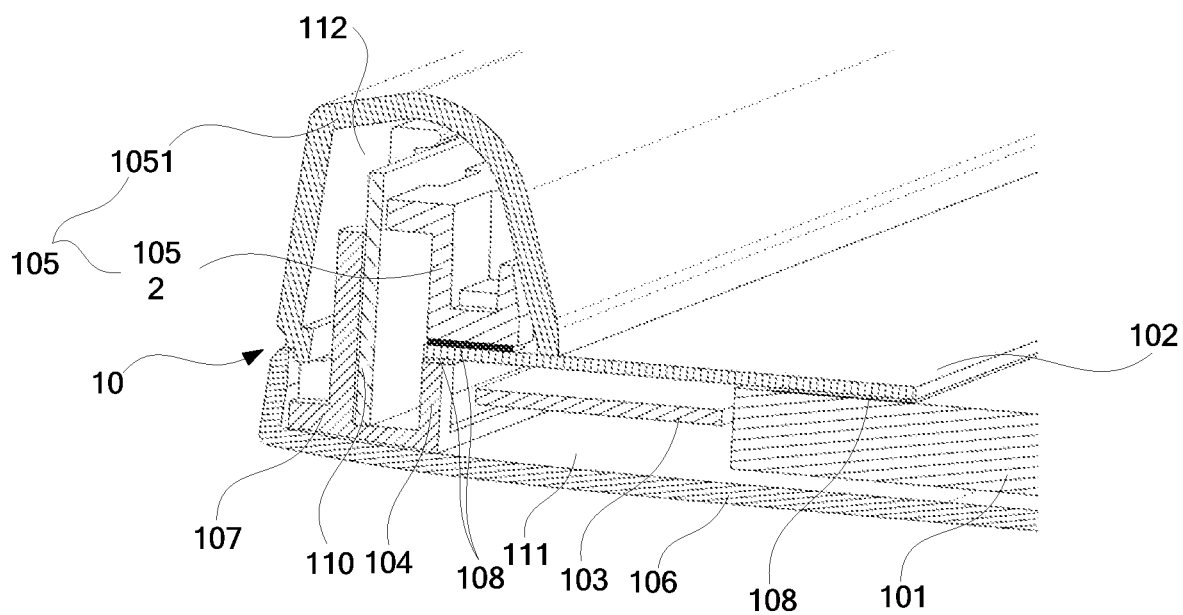
FIG. 12 is a sectional view of a bottom screen border of a mobile terminal according to another embodiment.

The screen cover plate 102 may further be pressed against the cover plate support platform 104 by using the cover plate support 1052, so that the screen cover plate 102 abuts against the cover plate support platform 104 when the cover plate support 1052 is fastened to the top cover support 107. To make a connection between the screen cover plate 102 and the cover plate support 1052 and a connection between the screen cover plate 102 and the cover plate support platform 104 more reliable, as shown in FIG. 12, the screen cover plate 102 and the cover plate support 1052 may be bonded and the screen cover plate 102 and the cover plate support platform 104 may be bonded by using adhesive such as the double-sided tape 108. In addition, the decorative cover 1051 and the screen cover plate 102 may also be bonded by using the double-sided tape, to improve fastening reliability of the decorative cover 1051 and reduce a gap between the decorative cover 1051 and the screen cover plate 102, thereby avoiding entrance of dust.

When the screen drive plate 103 and the screen body 101 are specifically disposed, as shown in FIG. 11 or FIG. 12, the screen drive plate 103 and the screen body 101 are disposed side by side, and the screen drive plate 103 and the screen body 101 may be connected by using an FPC (not shown in the figure). In addition, the screen drive plate 103 is disposed closer to the hinge cover 105 relative to the screen body 101. It may be understood that the screen drive plate 103 is disposed below the screen cover plate 102. It can be learned from the embodiment shown in FIG. 11 or FIG. 12 that a part of the screen drive plate 103 extends into a lower part of the hinge cover 105, so that the screen drive plate 103 overlaps a part of the hinge cover 105.

When the screen body 101 of the mobile terminal in this embodiment is a touch display, a screen touch drive panel 110 needs to be further disposed in the display module 10. The screen touch drive panel 110 may be disposed in an inner cavity of the hinge cover 105, and the screen touch drive panel 110 is connected to the screen body 101 by using an FPC. In this way, for disposing the screen touch drive panel 110, space of a bottom border of the display module 10 does not need to be additionally occupied.

In this embodiment, a part of the screen cover plate 102 and a part of the screen drive plate 103 extend into the cavity 112 of the hinge cover 105, and the cover plate support platform 104 used to support the screen cover plate 102 is also disposed in the cavity 112 of the hinge cover 105. In this way, the screen cover plate 102, the screen drive plate 103, and the cover plate support platform 104 each have a part that overlaps a width size of the hinge cover 105, so that a width size of the bottom border of the display module 10 can be effectively reduced, to facilitate implementation of a narrow border for the display module 10. In addition, this solution is also applicable to an existing common screen in the industry, and a customized screen is not required, so that costs of this solution can be effectively controlled.

When the display module 10 in this embodiment is assembled, the screen drive plate 103 and the screen body 101 that are connected by using the FPC may be first placed in the accommodating cavity 111 of the top cover 106. Then, the screen cover plate 102 covers the screen body 101, and an end of the screen cover plate 102 away from the screen body 101 is laid on the cover plate support platform 104. In addition, the screen cover plate 102 and the bottom border of the screen body 101 may be correspondingly bonded by using the double-sided tape 108 or the like, or the screen cover plate 102 and the cover plate support platform 104 may be bonded by using adhesive such as the double-sided tape 108. Then, the hinge cover support 1052 is disposed on the screen cover plate 102, and the hinge cover support 1052 is fastened to the top cover support 107 by using a fastener or a snap hook, so that the hinge cover support 1052 presses the screen cover plate 102 against the cover plate support platform 104. Finally, the decorative cover 1051 covers the top cover support 107 and the hinge cover support 1052, so that the decorative cover 1051 and the hinge cover support 1052 are fastened by using a fastener or a snap hook. In addition, the decorative cover 1051 may also be bonded to the screen cover plate 102. In this case, the display module 10 in this embodiment is assembled. Production and assembly processes can be effectively simplified, and assembly efficiency can be improved.

The foregoing descriptions are merely implementations, but are not intended to limit the protection scope. Any variation or replacement readily figured out by a person of ordinary skill in the art shall fall within the protection scope.

What is claimed is:

1. A mobile terminal, comprising
   a display module;
   a host module; and
   a hinge used to connect the display module and the host module, wherein the hinge is disposed on a bottom border of the display module, the display module comprises a top cover and a hinge cover that covers the hinge, the top cover has an accommodating cavity, a screen body and a screen drive plate are accommodated in the accommodating cavity, a screen cover plate covers the screen body, and a part of the screen cover plate extends into a cavity of the hinge cover, wherein the screen cover plate, the screen drive plate, and a cover plate support platform each have a part that overlaps a width of the hinge cover.

2. The mobile terminal according to claim 1, wherein a top cover support is further disposed on the top cover, and the hinge cover covers the top cover support, and is fixedly connected to the top cover support.

3. The mobile terminal according to claim 2, wherein the hinge cover is fastened to the top cover support by using a fastener.

4. The mobile terminal according to claim 2, wherein the hinge cover is snapped on the top cover support by using a snap hook.

5. The mobile terminal according to claim 2 wherein the cover plate support platform is disposed on the top cover support and the screen cover plate is laid on the cover plate support platform.

6. The mobile terminal according to claim 2, wherein the hinge cover presses the screen cover plate against the cover plate support platform.

7. The mobile terminal according to claim 2, wherein the hinge cover is bonded to the screen cover plate, and the screen cover plate is bonded to the cover plate support platform.

8. The mobile terminal according to claim 2, wherein the hinge cover comprises a hinge cover support and a decorative cover that are connected to each other, the decorative cover covers the hinge cover support and the top cover support, the hinge cover support is fixedly connected to the top cover support, and the hinge cover support presses the screen cover plate against the cover plate support platform.

9. The mobile terminal according to claim 8, wherein the hinge cover support is fastened to the decorative cover by using a fastener.

10. The mobile terminal according to claim 8, wherein the hinge cover support is snapped on the decorative cover by using a snap hook.

11. The mobile terminal according to claim 8, wherein the hinge cover support is fastened to the top cover support by using a fastener.

12. The mobile terminal according to claim 8, wherein the hinge cover support is snapped on the top cover support by using a snap hook.

13. The mobile terminal according to claim 1, wherein the screen drive plate and the screen body are disposed side by side, the screen drive plate and the screen body are connected by using an FPC, the screen drive plate is disposed closer to the hinge cover relative to the screen body, and a part of the screen drive plate extends into the cavity of the hinge cover.

14. The mobile terminal according to claim 1, wherein the screen cover plate and the screen body are bonded by using adhesive.

15. The mobile terminal according to claim 1, wherein a material of the screen cover plate is glass, polyester resin, or plastic.

16. The mobile terminal according to claim 1, wherein the screen body is a touch display, the display module further comprises a screen touch drive panel, the screen touch drive panel is disposed in the cavity of the hinge cover, and the screen touch drive panel and the screen body are connected by using an FPC.

* * * * *